United States Patent Office 3,458,881
Patented Aug. 5, 1969

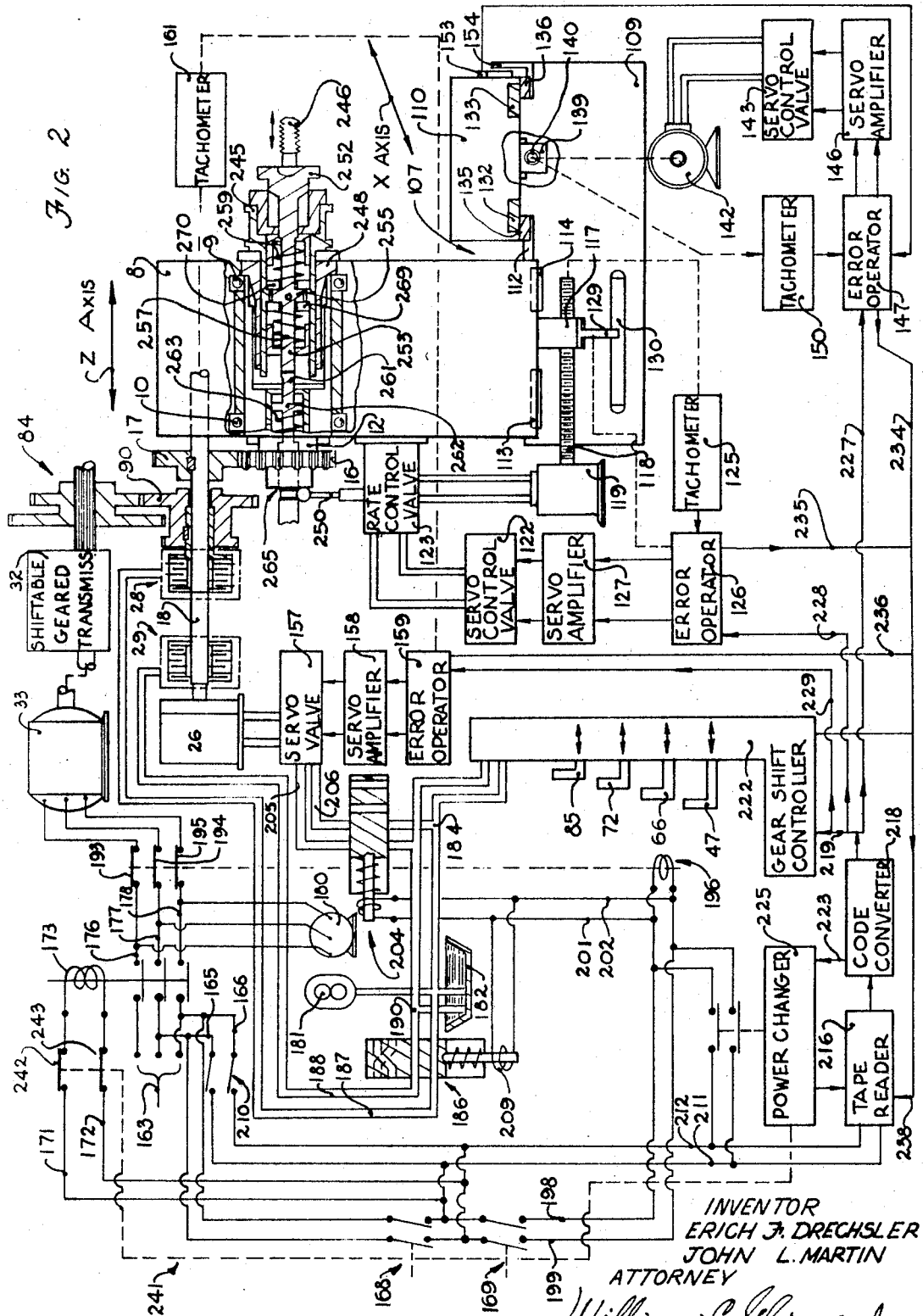

3,458,881
MACHINE TOOL VARIABLE POWER
TRANSMISSION
Erich F. Drechsler, Milwaukee, and John L. Martin, Wauwatosa, Wis., assignors to Kearney & Trecker Corporation, West Allis, Wis., a corporation of Wisconsin
Filed Dec. 2, 1966, Ser. No. 598,785
Int. Cl. B23g 1/16; F16h 37/06; B23c 1/00
U.S. Cl. 10—139                                6 Claims

ABSTRACT OF THE DISCLOSURE

This disclosure relates to an improved variable speed and variable power transmission mechanism for driving a machine tool spindle operative to perform a wide variety of machining operations including drilling, tapping and boring. To accomplish this with maximum effectiveness, a separate input power drive shaft is connected directly to rotate the tool spindle at a selected speed in one of two different power ranges and one of two different speed ranges. The first power train comprises a relatively high power motor driving a shiftably geared transmission connectible by a first clutch to rotate the spindle input drive shaft. A second drive train comprises a relatively low power servo motor connectible by a second clutch to rotate the spindle drive shaft independently of the first power train. During servo driven operation, the second clutch is engaged and the first clutch is disengaged to completely eliminate the inertia and backlash inherent in a shiftable geared transmission as well as any additional unnecessary gears keyed directly to the input drive shaft. This arrangement insures a considerably more accurate control of both the speed rate and a coordinately controlled feed drive during a tapping operation.

Figure 1:
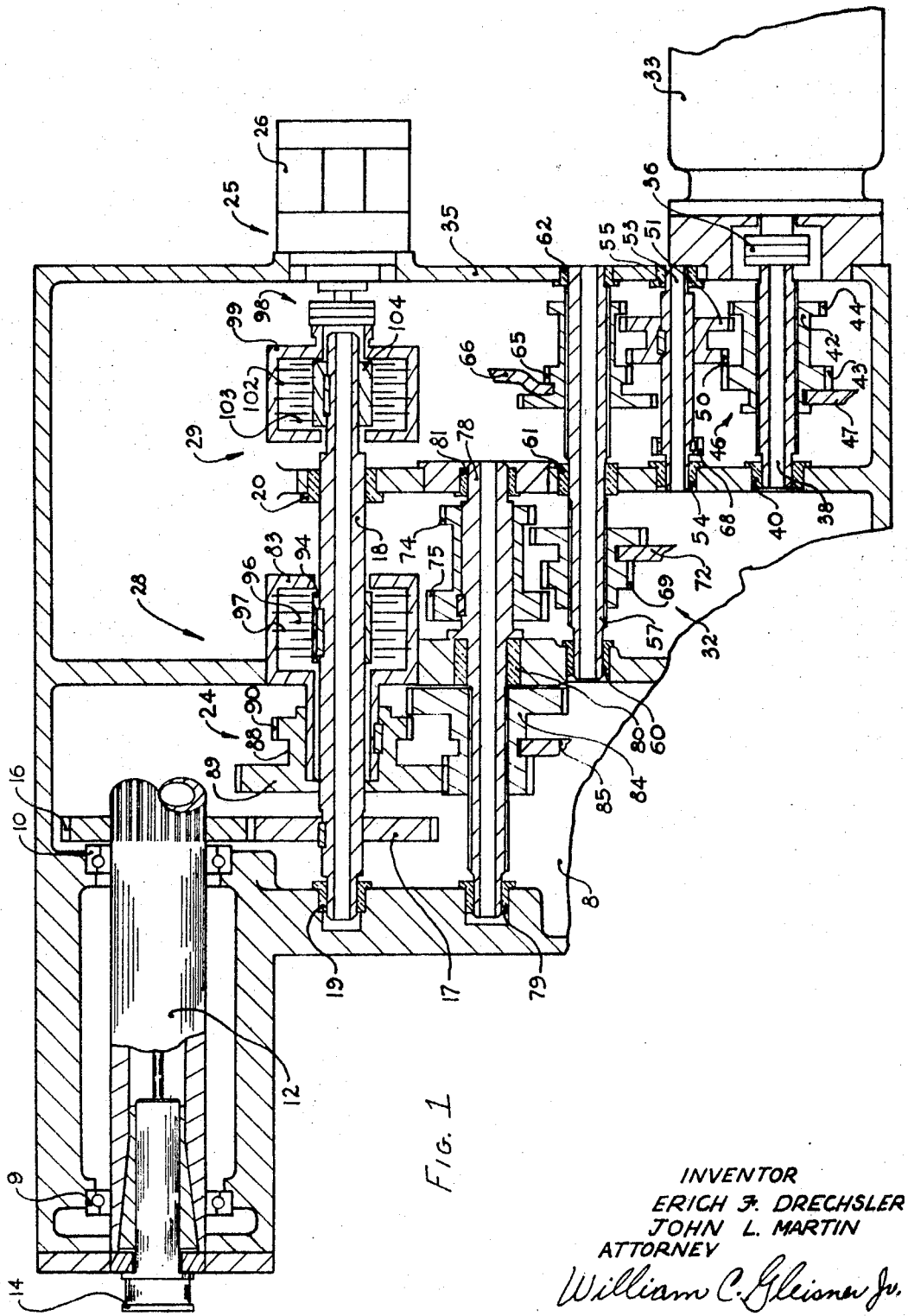

A principal object of the invention is to provide a variable speed transmission having a selectively operable dual power source.

Another object of the invention is to provide a dual power transmission mechanism adapted to rotate a machine tool spindle throughout an extremely wide range of operating speeds in performing different kinds of machining operations.

A further object of the invention is to provide an improved power driven variable speed transmission mechanism for rotating a tool spindle of a machine tool in performing tapping and other kinds of machining operations.

The foregoing and other objects of the invention which will become more fully apparent from the following specification, may be achieved by means of the exemplifying embodiments, depicted in and described in connection with the accompanying drawings in which:

FIGURE 1 is an enlarged, fragmentary view in vertical section through the upper portion of a machine tool illustrating the improved spindle driving transmission mechanism; and, FIGURE 2 is a schematic view of the machine tool incorporating the spindle drive transmission shown in FIG. 1 in combination with an operatively associated control system.

Referring to the drawings, include FIGS. 1 and 2, there is shown a spindle driving transmission incorporated in a machine tool adapted to perform a wide variety of machining operations such as drilling, tapping, boring, and face milling. A machine of this type is preferably provided with a numerical, tape control system such as the one schematically illustrated in FIG. 2 for selectively controlling machine positioning movements, as well as the feed and speed rates during machining operations.

As shown in fragmentary form in FIG. 1, a hollow supporting machine upright 8 is adapted to carry within its upward, forward portion axially spaced anti-friction bearings 9 and 10 for rotatably supporting a tool spindle 12. At its forward end, the tool spindle 12 is adapted in well-known manner to removably carry a tool holder 14, the latter being adapted to fixedly carry a metalworking tool for performing a selected machining operation. Toward its central portion, a driven gear 16 is splined to the spindle, and is engaged by a driving gear 17 keyed to the forward end of a rotatable drive shaft 18. A pair of axially spaced bearings 19 and 20 carried within circular openings formed in vertical walls of the machine upright 8 are adapted to rotatably support the main drive shaft 18 in parallel relationship with the tool spindle 12. To maintain a positive, reversible drive between the drive shaft 18 and spindle 12, the gears 17 and 16 are in a lash-free, one to one driving relationship.

Power for rotating the drive shaft 18 is selectively derived from a first power train 24 or a second power train 25, the latter comprising essentially a servo controlled drive motor 26.

Connection of the first power train 24 to rotate the drive shaft 18 is effected by selectively engaging a first multiple disc clutch 28. In a similar manner, connection of the second power train 25 for rotating the drive shaft 18 is effected by engaging a second multiple disc clutch 29. The arrangement is such that the clutches 28 and 29 are alternately engageable for transmitting power to rotate the drive shaft 18 at the selected rate, i.e. one of the clutches disengaged at the same time the other of the clutches is engaged to effect an operative driving connection for rotating the shaft 18.

As illustrated in FIG. 1, the first power train 24 comprises a shiftably geared transmission mechanism 32 driven by a relatively high powered input motor 33. The drive motor 33 is flange mounted in well-known manner and fixedly secured to a vertical rear wall 35 of the support upright 8. A driven output shaft of the motor 33 is connected by a coupling 36 to rotate a splined shaft 38 for supplying input driving power to the shiftable gear transmission 32. The splined shaft is supported for rotation at its rightward end by the drive coupling 36, and at its opposite leftward end by a bearing 40 mounted within a circular opening formed in a vertical wall within the upright 8. Slidably splined to the shaft 38 for axial shifting movement therealong is a couplet 42 respectively provided with different diameter gears 43 and 44. The leftward end the shiftable couplet 42 is provided with an annular groove 46 that is disposed in well-known manner to be engaged by a shifter fork 47 shown in fragmentary form in FIG. 1.

The axially shiftable couplet gears 43 and 44 are disposed to engage the gears 50 and 51 comprising a couplet fixedly keyed to a driven shaft 53 journaled at its opposite ends to rotate in bearings 54 and 55 carried by vertical walls of the upright 8. Leftward movement of the shifter fork 47 effects corresponding leftward movement of the couplet gear 44 into driving engagement with the gear 51 for rotating the driven shaft 53 at a preselected driving ratio. In like manner, shiftable movement of the fork 47 in an opposite rightward direction effects disengagement of the gear 44 and engagement of the couplet gear 43 into driving engagement with the gear 50 for rotating the driven shaft 53 at a different preselected speed rate. In either case, as well known in the art, the shifter fork 47 is laterally movable both to effect shiftable movement of the couplet 42, as well as to retain one or another of the couplet gears in driving engagement with a cooperating one of the gears carried by the driven shaft 53.

Another parallel shaft 57 provided with spaced apart splined portions is journaled in three bearings 60, 61, and 62 respectively carried by spaced apart walls of the support upright 8. One gear couplet 65 carried by the rightward splined portion of shaft 57 is provided with an annular groove engaged by a shifter fork 66. Leftward shifting movement of the fork 66 effects corresponding leftward movement of the couplet 65, thereby moving a small diameter gear carried thereby into driven engagement with the cooperating gear 51 keyed to the rotatable shaft 53. In similar manner, rightward movement of the shifter fork 66 effects corresponding rightward movement of the couplet 65, thereby disengaging the small diameter gear presented thereby and effecting shifting movement of the large diameter gear into driven engagement with a gear 68 keyed to the adjacent parallel shaft 53. Movement of the shifter fork 66 is adapted to move the gear couplet 65 for retaining either the small or large diameter gears integrally formed therewith in meshing driven engagement with one or another of the cooperating gears 51 or 68 keyed to the shaft 53.

Another axially shiftable gear couplet 69 is slidably splined to the leftward splined portion of the rotatable shaft 57. A shifter fork 72 engaging an annular groove presented by the couplet 69 is operable to effect leftward shiftable movement of a small diameter gear carried thereby into engagement with a cooperating gear 75 which together with a gear 74 comprises a couplet fixedly keyed to the rightward end of a rotatable shaft 78. Rightward movement of the shifter fork 72 effects disengagement of the small diameter couplet gear and meshing engagement of the large diameter couplet gear with the gear 74 for transmitting driving power from the shaft 57 to rotate the parallel shaft 78. As shown in FIG. 1, the shaft 78 is rotatably journaled in three axially spaced apart bearings 79, 80 and 81 respectively carried within circular openings presented by spaced apart walls of the machine upright 8. Toward its leftward central portion, the rotatable shaft 78 is provided with a splined portion engaged by an axially shiftable gear couplet 84 presenting an annular groove engaged by a cooperatively disposed shifter fork 85.

Whenever the first drive clutch 28 is disengaged, as shown in FIG. 1, a hollow clutch housing 83 is in completely disengaged relationship to the drive shaft 18. During disengagement of the drive clutch 28, therefore, the drive shaft 18 is independently rotatable relative to the clutch housing 83. In effect, the hollow clutch housing 83 is freely rotatable relative to the drive shaft 18.

The clutch housing 83 is provided with a leftwardly extending tubular portion of reduced diameter extending within an enlarged bore of a gear couplet 88 fixedly keyed thereto. The non-shiftable gear couplet 88 is provided with gears 89 and 90 respectively engageable with the cooperating gears presented by the associated shiftable gear couplet 84. With the shifter fork 85 shifted as in FIG. 1, the small diameter gear presented by the couplet 84 is retained in meshing engagement with the large diameter gear 89 of the non-shiftable couplet 88. Whenever the shifter fork 85 is moved leftwardly, the small diameter gear presented by the couplet 84 is moved to disengaged position and the large diameter gear is in turn moved into continuous meshing engagement with the gear 90 of the couplet 88.

A shifting control system is provided to effect predetermined, coordinated shifting movement of the shifter forks 47, 66, 72 and 85 to effect shiftable engagement of the respectively associated gear couplets 42, 65, 69 and 84 for selectively varying the speed of the shiftable gear transmission 32. Whenever the four identified shiftable gear couplets are in predetermined engaged position, the main drive motor 333 is operatively connected to rotate the gear couplet 88 and hollow clutch housing 83 at a selected one of a plurality of stepped output speed rates. With these conditions having been established, the first power train 24 is then connectable upon engagement of the multiple disc clutch 28 for transmitting driving power from the clutch housing 83 to rotate the drive shaft 18.

As illustrated in FIG. 1, the first clutch 28 is provided with an inner hub 94 keyed directly to a central portion of the drive shaft 18. As schematically represented, a plurality of small diameter, circular clutch plates, such as the plate 96, are provided with bored openings and are respectively secured to the inner clutch hub 94. The small diameter clutch plates are disposed in alternately spaced relationship with large diameter circular plates, such as plate 97, respectively secured at their outer peripheries to the enlarged circular portion of the clutch housing 83. Inasmuch as the mode of operation of multiple disc clutches is well-known in the art, it is deemed sufficient to state that hydraulic fluid under pressure is supplied to urge the small and large clutch plates 96 and 97 respectively into driving engagement by means of a source of pressure fluid (not shown).

With the clutch 28 engaged and the drive motor 33 energized, it will be apparent that driving power is transmitted from the gear couplet 88 and outer clutch housing 83 via the interengaged clutch plates and hub 94 to rotate the drive shaft 18, thereby effecting rotation of the intermeshing gears 17 and 16 to drive the tool spindle 12.

Whenever the clutch 28 is disengaged and the drive motor 33 deenergized, the clutch 29 may be engaged and the servomotor 26 energized for rotating the drive shaft 18 at a preselected one of an infinitely varied speed rate. To accomplish this, driving power is transmitted from the servomotor by an output shaft and a coupling 98 connected to rotate a hollow outer housing 99 of the second drive clutch 29. A plurality of large diameter clutch plates, such as 102, secured to the housing 99 are disposed in alternately spaced relationship to small diameter clutch plates, such as 103 secured to the clutch hub 104 keyed directly to a rearward portion of the drive shaft 18.

With the clutch 28 disengaged or disconnected, the clutch 29 is engageable by means of pressure fluid (not shown) which is operative to effect frictional engagement between the interengaged clutch plates to effect transmission of power between the outer clutch housing 99 and the drive shaft 18. With the second drive clutch 29 engaged, power is transmitted from the servo drive motor 26 for rotating the drive shaft 18, together with gear 17 and 16 for driving the tool spindle 12 at a preselected infinitely variable rate. With a lash-free interconnection between the gears 16 and 17, it will be apparent that a minimum of inertia is inherent in the second power transmitting train 25 comprising principally the servo motor 26. This is particularly true in view of the fact that only the clutch hub 94 of the first drive clutch 28, together with the plurality of small diameter of clutch plates 96 are secured to the central portion of the drive shaft 18 during servo driven operation of the tool spindle. With the clutch 28 completely disengaged, therefore, the entire shiftable gear transmission 32 and relatively high speed input motor 33 are completely disengaged from a driving connection with the shaft 18. Thus, the preselected speed of the servo driven motor 26 can be precisely regulated during a tapping operation by means of the usual rate control, feedback loop (not shown) in FIG. 1. Likewise, reversed control at the completion of a tapping operation can be precisely controlled without the disadvantage of the inertia and backlash inherent in the shiftably geared transmission 32. This arrangement is particularly advantageous in controlling tapping operations of a machine tool, and tend to eliminate damage both to a tapping tool and a workpiece during a tapping operation.

Heretofore, it has been customary to provide different kinds of machine tools for performing those operations made possible by the dual power transmission illustrated in FIG. 1 under the separate rate regulated control of the servo drive motor 26 and relatively high powered motor 33. The separate machines of the prior art necessitated removal of the workpiece from one working station in one machine and transfer of that workpiece to a second machine for performance on the different type of operation. In particular, the selective dual powered transmission illustrated in FIG. 1 is of advantage in machine tools of the machining center type utilizing tool changer mechanisms and numerical control systems.

As illustrated in fragmentary schematic form in FIG. 2, the improved tool power transmission is incorporated in a machine tool 107. The machine tool illustrated in simplified schematic form in FIG. 2 is provided with movable tool supporting and work supporting members controlled by a numerical control system that is likewise represented in simplified diagrammatic form. The machine tool 107 is provided with a base 109 adapted to slidably support the spindle upright 8 and a cooperating worktable 110 for movement in mutually perpendicular directions. The machine base 109 is provided with parallel spaced apart guideways, such as the guideway 112, transverse to the axis of movement of the work table 110. Cooperating guideways presented by the underside of the spindle upright 8 slidably engage the guideways presented by the machine base 109 and are secured thereto by means of cooperating gibs in well known manner. For example, as shown in FIG. 2, gibs 113 and 114 are secured to the spindle upright 8 in a manner to engage the underside of the guideway 112 on the machine base. Secured to the underside of the spindle upright 8 is a depending translating nut 117 threadedly engaging a rotatable translating screw 118 selectively driven by a servo motor 119. Both the rate and direction of movement of the upright 8 during a machining operation is determined by the predetermined adjustment of a servo controlled valve 122 which is connected by a pair of fluid conduits to a modulating rate control valve 123, the latter in turn being connected by a pair of separate conduits to the servo motor 119. The rate control valve 123 is operative primarily during a tapping operation to effect a slight, modulating effect upon the preset operation of the servo control valve 122. During the usual drilling, boring or milling operations, the rate control valve 123 is not actuated to perform its modulating effect, as will hereinafter be more fully explained.

To ensure transverse movement of the upright 8 at its predetermined uniform rate, the cross feed screw 118 is connected in well-known manner to actuate a tachometer 125 that in turn is connected to provide feedback control information to an error operator 126. The error operator 126 is connected to provide command control information that is transmitted to operate a servo amplifier 127 for accurately controlling both the velocity and extent of movement of the servo motor 119. To provide positional feedback information of the location of the spindle upright 8 along the Z axis, an electrical sensing head 129 is secured to the underside of the depending nut 117 for movement therewith. The sensing head 129 is thus moved relative to a cooperating scale 130 secured directly to the machine base 109 and connected to be energized by means of supply conductors (not shown). The sensing head 129 is connected via a broken line schematically illustrated in FIG. 2 for providing positional feedback information to the error operator 126.

The table 110 is provided on its underside with longitudinally extending guideways disposed to engage guideways 132 and 133 secured to the upper portion of the base 109, and extending in a direction perpendicular to the plane of Z axis movement. To retain the worktable 110 in proper slidable engagement with the guideways 132 and 133 gibs 135 and 136 are secured to the downwardly extending edges of the table 110 in a position to engage the undersides of guideways 132 and 133. For effecting longitudinal table movement along the X axis, a translating nut 139 secured to the underside of the worktable 110 is threadedly engaged by a rotatable translating screw 140 journaled in well-known manner at its opposite ends to rotate in bearings (not shown) secured directly to the machine base 109.

As schematically shown in FIG. 2, power for rotating the translating screw 140 is derived from a hydraulic servo motor 142 connected by a pair of fluid supply conduits to be controlled by a servo control valve 143. The servo control valve 143 operates the motor 142 for controlling the direction, rate and extent of movement of the worktable 110 in response to the servo amplifier 146. For actuating the servo amplifier 146, the error operator 147 is connected to provide command control information for effecting the required worktable movement along the X axis. During movement of the worktable 110, rotational movement of the table screw 140 is connected to mechanically operate a tachometer 150 for providing the necessary velocity feedback control information to the error operator 147. A sensing head 153 secured to an outer side face of the worktable 110 is disposed to cooperate with an electrical scale 154 secured to the machine base 109 and disposed to be energized by supply conductors (not shown). During positional movement of the worktable 110, the sensing head 153 is likewise connected to supply a positional feedback signal to the error operator 147 as schematically illustrated in FIG. 2. A servo valve 157 is interconnected by means of a pair of supply conduits to drive the servo drive spindle motor 26. For controlling the velocity and direction of spindle rotation, an error operator 159 is connected to provide the required command signals to a servo amplifier 158 which, in turn, is connected to actuate the servo valve 157 for operating the servo motor 26. During a tapping operation, the servo motor 26 is connected to rotate the shaft 18 and, in turn, operate a tachometer 161 connected to provide velocity control feedback information to the error operator 159.

To effect bodily movements of the moveable members 8 and 110 along the Z and X axes, as well as control rotational movement of the tool spindle 12, there is provided the tape control system schematically illustrated in FIG. 2. Although not illustrated in FIG. 2, it will be apparent that a similar arrangement can be incorporated for effecting and controlling additional axes of movement. For example, in many cases, the tool spindle 12 is rotatably supported in a separate slide (not shown) mounted for selective vertical movement along a Y axis serving to provide an additional positioning component of movement for the tool spindle. The usual three phase power source 163 is provided to selectively energize the main drive motors as well as energize a control circuit including transversely extending control conductors 165 and 166.

For effecting manually controlled selective engagement of the spindle clutches 28 and 29 independently of the tape control system, there is provided a pair of manually operated switches 168 and 169. Closure of the switch 168 completes a control circuit from energized control conductors 165 and 166 to energize conductors 171 and 172 connected to energize the coil of the spindle motor control relay 173. Energization of the relay 173 effects movement of the associated three normally open contacts to closed position to complete a connection from the three phase supply conductors to energize three corresponding conductors 176, 177 and 178. With these conductors energized, circuits are completed via three transversely extending conductors to energize a pump drive motor 180. The motor 180 is connected to drive a hydraulic pump 181 connected to withdraw hydraulic fluid from a sump 182 and supply fluid under pressure to a main supply conduit 184. With the valve spool of a control valve 186 resiliently biased to its upper position, as shown in FIG. 2, fluid under pressure is transmitted from conduit 184 to a conduit 187 that is connected to effect actuation of the drive clutch 28 to its engaged position, thereby connecting the gear 90 to drive the shaft 18, as hereinbefore explained. At the same time, the clutch 29 is disengaged due to the fact that conduit 188 is connected via the outwardly urged spool of valve 186 to a main exhaust conduit 190.

With conductors 176, 177 and 178 energized, circuits are completed via the normally closed contact bars 193, 194 and 195 of a control relay 196 to effect energization of the relatively high powered drive motor 33. As hereinbefore explained, the motor 33 is connected to drive the shiftable transmission mechanism 32 for rotating gear couplet 84 to drive the gear 90 for rotating the shaft 18.

After the switch 168 has been manually engaged, the switch 169 is likewise manually engageable to disconnect the clutch 28 and effect an engagement of the clutch 29 for connecting the servo drive motor 26 to rotate the shaft 18. Closure of the switch 169 effects energization of conductors 198 and 199 which are connected to energize the coil of control relay 196, thereby moving the associated contact bars 193, 194 and 195 to open position to deenergize the high powered spindle drive motor 33. A circuit is likewise completed from energized conductors 198 and 199 via conductors 201 and 202 to energize a coil of a control valve 204. With the valve 204 thus actuated, a leftwardly biased valve spool therein is urged to a rightward position for completing hydraulic circuits from fluid conduits 190 and 184 via ports in the downwardly urged valve spool to fluid conduits 205 and 206 connected to the servo valve 157. With this condition existing, fluid is transmittable from the servo valve 157 by a pair of conduits to effect operation of the servo motor 26. Manual control means (not shown) are likewise provided to selectively actuate the error operator 159 to operate the servo amplifier 158 for controlling the servo valve 157 during manually controlled operation of the servo drive motor 26, and thereby driving the spindle 12 at a selected speed rate.

At the same time, the energized conductors 201 and 202 are likewise connected via a pair of transverse conductors to energize the coil 209 of the valve 186. Energization of the coil 209 effects downward movement of the valve spool of the valve 186 in opposition to resilient means. As this occurs, the main exhaust conduit 190 is connected via a port in the downwardly urged valve spool to the conduit 187, thereby effecting deenergization of the clutch 28. At the same time, the main pressure supply conduit 184 is connected via another port in the downwardly urged valve spool to supply pressure fluid to the conduit 188 connected to effect energization of the clutch 29 for connecting the servo drive motor 26 to rotate the drive shaft 18.

It will be apparent that manual operation of the switches 168 and 169 are operable to effect selective engagement of the clutches 28 and 29 for operating the dual power transmission to drive the tool spindle 12 at preselected power. Prior to effecting tape controlled operation of the various moveable members of the machine, both of the switches 168 and 169 are moved to open, disconnected position for disconnecting the clutches 28 and 29, as well as deenergizing the various power drives. A control switch 210 is operable to complete circuits from the energized conductors 165 and 166 to energize a pair of conductors 211 and 212. Energization of the conductors 211 and 212 effects energization of conductors 171 and 172 to effect energization of a motor control relay 173. As hereinbefore explained, energization on the relay 173 effects closure of the associated contact bars to immediately effect energization of the hydraulic drive motor 180 and, with contact bars 193, 194 and 195 in normally closed position, also to effect energization of the motor 33. With the motor 33 energized, and the valve spool of valve 186 in its upwardly biased position, as schematically illustrated in FIG. 2, pressure fluid is transmitted from the pressure supply conduit 184 to 187 to effect engagement of the drive clutch 28. With these conditions having been established, energized conductors 211 and 212 are connected to operate a tape reader 216, as schematically illustrated in FIG. 2, for controlling movement of the various machine members.

As well-known in the art, the tape reader 216 is provided with a plurality of switches operative in binary code fashion by means of switch plungers engaging appropriately spaced holes in a punched tape which is mechanically advanced relative to the reader. From the tape reader 216, information is transmitted by a conductor to activate a code convertor 218 which is adapted to convert information from the tape code to the decimal code for directly operating the machine. In addition, the code convertor is also operative as a storage register for storing command information to effect the required machine movements. For example, position command information from the tape is stored in registers within the code convertor 218 in the form of sine-cosine voltage ratios for predetermined, selected point-to-point positioning movement of the machine upright 8 and work table 110. Also, information from the tape reader is stored in registers within the code convertor for controlling the velocity of the upright 8, work table 110, as well as the rotational speed of the spindle 12 during a tapping operation. In addition, various other forms of information are stored relating to gear shifting movements of the shiftable transmission 32, power changing of the dual powered transmission, and stopping spindle 12 for inserting or withdrawing a tool holder therefrom.

From the code convertor 218, a conductor is connected to transmit machine operating input signals to a common trunk line 219 which is directly connected to transmit command instructions to the various operators, as well as a gear shift controlled 222. In addition, the code convertor 218 is connected to supply command information via an output conductor 223 to actuate a power changer 225 operable both to control the dual power transmission, as well as completely stop the machine spindle 12 for interchanging tools. From the main trunk line 219, positional and velocity control signals are transmitted along conductors 227, 228 and 229 respectively connected to supply command information to the error operators 147, 126 and 159. The error operators 147, 126 and 159 are likewise connected via return conductors 234, 235 and 236 interconnected via a common return trunk line 238 to supply function complete information for reactivating the tape reader 216 to provide additional blocks of information in well-known manner.

With the machine connected for tape controlled operation as described, and as illustrated in FIG. 2, it will be recalled that the spindle motor 33 is energized to drive the shiftable transmission 32 for transmitting power via the engaged clutch 28 to rotate the tool spindle 12 at a preselected speed rate. For changing the output speed from the transmission 32, the gear shift controller 222 is operative to effect a preselected lateral shifting movement of forks 47, 66, 72 and 85 for effecting corresponding shifting movement of the associated gear couplets as hereinbefore explained. The gear shift controller 222 is of the hydraulic type provided with connections to the fluid conduits 184 and 190, as well as shifting pistons (not shown) respectively associated with the several shifting forks.

For completely stopping rotation of the tool spindle 12 in interchange tools, the power changer 225 is predeterminately operated to actuate a relay 241 thereby urging associated normally closed contact bars 242 and 243 to open position to effect deenergization of the relay 173 and corresponding deenergization of both the spindle drive motor 33 and the spindle drive hydraulic supply motor 180.

Upon the insertion of a different tool holder, such as the tapping tool holder 245 in tool spindle 12, the relay 241 is caused to be deenergized, for effecting a reenergization of the relay 173 to again energize the spindle drive motor 33 and hydraulic supply motor 180. The tapping tool holder 245 is provided with a rearwardly extending circular shank that is clamped within a selectively contractible collet, such as the collet 248 schematically illustrated in FIG. 2. The collet 248 is carried at the forward end of the tool spindle 12 and is connected to be selectively expanded or contracted into clamping position by a power actuator (not shown). The tapping tool holder 245 is of the floating type in which a tap, such as tap 246, together with a support shaft 253, is relatively movable in an axial direction during a threading operation. This arrangement is generally similar to that disclosed in U.S. Patent 3,052,011 to Brainard et al.

During a threading operation, it is necessary to correlate the preset rotational speed rate of the tool spindle 12 with the outward axial feed rate of the spindle upright 8 along the Z axis. To accomplish this, the spindle drive servo motor 26 is connected by means of the engaged clutch 29 to rotate the tool spindle 12 at a predetermined speed rate by command instructions initially supplied by the tape reader 216 for a particular program of machine functions. At the same time, coordinated command instructions are disposed to operate the Z axis, servo motor 119 at a predetermined feed rate. To insure continued, proper correlation between the Z axis feed drive and spindle speed rates, the rate control valve 123 is operative to effect a continuous modulating control of the predetermined feed rate of the Z axis servo motor 119. A pivoting control lever 250 carried by the rate control valve 123 is leftwardly movable to effect a slight deceleration of the servo motor 119 from its preset feed rate. Slight rightward or forward movement of the control lever 250 actuates the valve 123 to effect a slight acceleration in the preset feed rate of the motor 119. Either a slight leftward or a rightward movement of the pivotable control lever 250 is effected by a corresponding relative movement of a tapping tool, such as the tap 246, upon any slight deviation from the required, preset Z axis feed rate during a threading operation for maintaining proper correlation with the spindle speed rate.

To effect this result, the tap 246 is fixedly secured within the enlarged outer end of a tap support 252 having an inwardly extending shaft 253 of reduced diameter and that is mounted in suitable spaced apart bushings carried within an enlarged circular bored opening formed in the tapping tool holder 245. A flanged circular guide member 255 secured to the central portion of the shaft 253 is resiliently centered by a rearward spring 257 and a forward spring 259, the opposite outer ends of which abut inner, side faces of the guide bushings carried within the tap holder 245.

It will be apparent that the centering springs 257 and 259 operate upon the opposite faces of the guide member 255 to resiliently center the tap support shaft 253 and tap 246 relative to the tap holder 245, and yet permit a slight axial movement relative thereto in either direction during a threading operation.

Axially movable centering washers 269 and 270 are respectively interposed between the inner ends of the centering springs 257 and 259 and the respective opposite faces of the guide member 255 affixed to the axially movable tap support shaft 253. The respective inner faces of the centering washers 269 and 270 are normally maintained in abutting engagement with inwardly extending radial shoulders integrally formed with tap holder 245. The respective centering washers 269 and 270 are thus normally maintained in resilient abutting engagement with the cooperating shoulders for positively maintaining the guide member 255 and support shaft 253 in axially centered position. At the same time, this arrangement does not preclude either axial inward or outward movement of the tap support shaft 253, inward movement being adapted to compress the rearward spring 257 slightly and outward movement being adapted to compress the forward centering spring 259 slightly. In the event the tap feed rate is excessive, the tap 246 tends to urge the support shaft 253 rearwardly during a threading operation. As this occurs, the guide member 255 affixed to the shaft 253 urges the centering washer 269 and rearward spring 257 in a corresponding rearward direction, the forward spring 259 and associated centering washer 270 having no effect upon the tap shaft position. Conversely, if the threading rate is too slow, the tap 246 tends to be pulled forward slightly, thereby displacing the support shaft 253 in an axially forward direction. As this occurs, the guide member 255, forward centering washer 270 and forward spring 259 are compressed in a forward direction with the rearward spring 257 then having no effect upon shaft position. The rearward spring 257 tends to exert a slightly greater resilient force than the forward spring 259 upon the axially centered position of the tap support shaft 253. Thus, during a threading operation the rearward spring 257 exerts sufficient force to withstand the normal cutting pressures upon the tap 246 as it is fed forwardly to perform the threading operation. The forward centering spring 259, on the other hand, exerts slightly less force in a manner to preclude breaking the last few threads of a tapped hole as the tap 246 is axially withdrawn after a threading operation has been completed.

At its rearward end, the tap support shaft 253 abuts the forward or outer end of a rate control shaft 261 that is slidably carried by suitably spaced guide bushings supported within the central rearward portion of the tool spindle 12 for relative axial movement.

A resilient mechanism carried by the spindle 12 is adapted to retain the tap control shaft 261 in forwardly urged engagement with the tap control shaft 253. An annular groove 265 at the rearward end of the shaft 261 engages a spherical end of the control lever 250 for maintaining the rate control valve in non-modulating condition whenever the tap support shaft 253 is resiliently centered. The resilient mechanism for the rate control shaft 261 comprises a spring 263 engaging a guide flange 262 secured to the shaft 261. The spring 263 is compressed slightly whenever the outer end of shaft 261 is abutting the inner end of tap support shaft 253, thus permitting axial movement.

The spring 263, therefore, provides less force than the forward centering spring 259 associated with the tap support shaft 253. The arrangement is such that the rightward, or forward outer end of the rate control shaft 261 is resiliently maintained in abutting engagement with the inner, or rearward end of the tap support shaft 253 without displacing the latter from its proper, resiliently centered position. With this arrangement, it will be apparent that any slight axial movement of the tap 246 in either direction during a threading operation will effect corresponding axial movement of the support shaft 253 and tap control shaft 261 for effecting pivotable movement of the rate control lever 250 in the required direction. Consequently, upon movement of the rate control lever 250, the rate control valve 123 is actuated to effect the required correction in the output feeding rate of the servo drive motor 119. Upon completion of a particular threading operation control instructions are supplied to operate the error operator 126, servo amplifier 127 and servo valve 122 for effecting reversed movement of the servo motor 119 for withdrawing the tap 246. During withdrawal, it will be understood that control instructions are likewise supplied to actuate the servo valve 157 for effecting reversed rotation of the servo drive spindle motor 26 to reverse the rotational direction of the spindle 12 and tap 246 in coordinated relationship with the reversed direction and rate of withdrawal movement effected by the servo motor 119.

From the foregoing detailed description of the illustrative embodiments set forth herein to exemplify the present invention, it will be apparent that there has been provided an improved machine tool incorporating a dual powered spindle drive transmission mechanism particularly appropirate for operating the tool spindle of a machining center. This particular spindle drive transmission is adapted to operate a machine tool spindle for performing an especially wide range of machining operations including drilling, boring and milling, as well as threading operations.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invetnion may be incorporated in other structural forms wtihout departing from the spirit and scope of the invention as defined in the subjoined claims.

The principles of this invention having now been fully explained in connection with the foregoing description, we hereby claim as our invention:

1. In a machine tool having a rotatably journaled tool spindle;
   a separate rotatably journaled drive shaft connected to rotate said spindle at a selected speed in one of two different driving ranges;
   a pair of like diameter gears with one gear being secured to said spindle and the other gear being secured to said drive shaft for intermeshing engagement to transmit power therebetween;
   separate first and second driven clutch elements fixedly secured to said drive shaft in axially spaced apart positions therealong and being selectively and individually engageable for receiving input driving power;
   a shiftably geared power driven transmission mechanism adapted to constitute one source of input driving power for rotating said spindle drive shaft;
   a selectively variable speed servo drive motor adapted to constitute another source of driving power for rotating said spindle drive shaft;
   a first driving clutch element selectively engageable to transmit power from said shiftable transmission mechanism to said first driven clutch element for driving said spindle drive shaft at a selected speed in one range;
   a second driving clutch element selectively engageable to transmit power from said servo drive motor to said second driven clutch element for driving said spindle drive shaft at a selected speed in a different range; and,
   control means actuatable to effect selective engagement of a selected one of said driving clutch elements with said associated driven clutch element and disengagement of the other of said driving clutch elements relative to its said associated driven clutch element.

2. In a machine tool according to claim 1 including feed drive means connected to effect axial feeding movement of said tool spindle in a selected direction;
   a servo controlled feed drive motor connected to effect rate controlled movement of said feed drive means for moving said spindle in a selected direction;
   a servo feed control valve connected to selectively vary the spindle feeding rate effected by said servo feed drive motor; and,
   a rate control shaft movably carried by said tool spindle for predeterminately actuating said servo control valve.

3. In a machine tool according to claim 1 including a tool support slidably mounted to carry said tool spindle for rectilinear axial feeding movement;
   a workable mounted in a cooperating relationship to said relatively movable tool support;
   a frame adapted to carry said spindle carrying tool support and said worktable for relative movement;
   translating drive means operatively connected to effect relative feeding movement between said worktable and said spindle carrying tool support;
   a servo controlled feed drive motor connected to effect predetermined rate controlled movement of said translating drive means;
   a servo control valve connected to selectively vary the feed rate effected by said servo controlled feed drive motor;
   a rate control shaft movably carried by said tool spindle for axial movement to predeterminately actuate said servo control valve; and,
   a tapping toolholder carried by said spindle for effecting axially controlled rectilinear feeding movement of a tap during a tapping operation and being adapted to effect a slight axial movement of said tap relative to said spindle to selectively actuate said rate control shaft to selectively control the tapping feed rate.

4. In a machine tool having a rotatably driven tool spindle;
   an input drive shaft directly connected to rotate said spindle in one of two different driving ranges;
   a first set of driven clutch plates and a second set of driven clutch plates fixedly secured in longitudinally spaced positions to said input drive shaft;
   cooperating first and second sets of longitudinally spaced apart driving clutch plates respectively disposed in cooperating intermeshing positions relative to said spaced apart driven clutch plates for alternate actuation into selective driving engagement therewith;
   a shiftably geared power driven transmission including a driven gear connected to selectively rotate said first set of driving clutch plates independently of said first set of driven clutch plates associated therewith;
   a servo motor including a driven member connected to selectively rotate said second set of driving clutch plates independently of said second set of driven clutch plates associated therewith; and,
   selectively operable clutch control means connected to effect actuation of a selected set of said driving clutch plates into driving engagement with said associated driven clutch plates and being simultaneously operative to retain the other cooperatively intermeshing driving and driven sets of clutch plates disengaged.

5. In a machine tool according to claim 4 including a machine frame;
   a spindle support movably carried by said frame for slidable rectilinear movement, said spindle support being adapted to rotatably carry said tool spindle and said drive shaft for rotation about spaced apart parallel axes both parallel to the rectilinear axis of support movement;
   separate gears of like diameter respectively secured to said tool spindle and said drive shaft in intermeshing driving engagement;
   power driven translating means connected to effect rectilinear movement of said spindle support at a selected rate and in a selected direction of movement;
   a servo controlled feed motor connected to drive said translating means at a selected rate for moving said spindle support at a feeding rate in predetermined coordinated relationship to the rotational speed of said tool spindle;
   a servo feed control valve connected to effect feed rate controlled actuation of said servo feed motor; and,
   a rate control shaft carried by said spindle for axial movement relative thereto and being connected to effect predeterminately controlled actuation of said servo feed control valve.

6. In a machine tool having a frame;
   a spindle support and a cooperating work support carried by said frame for relative rectilinear movement to perform a machining operation;
   a tool spindle and an input drive shaft journaled in said spindle head, said drive shaft connected to rotate said spindle in one of two different driving ranges;
   a first set of driven clutch plates and a second set of driven clutch plates fixedly secured in longitudinally spaced positions to said input drive shaft;

cooperating first and second sets of longitudinally spaced apart driving clutch plates respectively disposed in cooperating intermeshing positions relative to said spaced apart sets of driven clutch plates for alternate actuation into selective driving engagement therewith;

a shiftably geared power driven transmission mechanism including a driven gear connected to selectively rotate said first driving clutch plates independently of said first set of intermeshing driven plates associated therewith;

a servo motor including a driven member connected to selectively rotate said second set of driving clutch plates independently of said second set of driven clutch plates associated therewith;

clutch actuating control means connected to effect selective engagement of one set of said driving clutch plates into driving engagement with said driven clutch plates associated therewith and said control means being simultaneously operative to certain said other cooperating sets of driving and driven clutch plates disengaged;

translating means connected to effect relative movement between said spindle support and said work support;

servo feed power drive means connected to actuate said translating means for effecting coordinate relative movement between said spindle support and said work support;

a rate control shaft carried by said spindle for axial movement relative thereto for adjusting the rate of said servo feed power drive means; and, a tapping tool carried by said spindle for limited axial movement to adjust said rate control shaft for controlling the relative feeding rate effected by said translating means.

References Cited

UNITED STATES PATENTS

| | | | |
|---|---|---|---|
| 2,310,878 | 2/1943 | Stephan | 77—3 |
| 2,988,965 | 6/1961 | Armitage et al. | 90—11 |
| 3,052,011 | 9/1962 | Brainard et al. | 77—5 X |
| 3,273,182 | 9/1966 | McDonald | 77—32.7 X |

ANDREW R. JUHASZ, Primary Examiner

G. WEIDENFELD, Assistant Examiner

U.S. Cl. X.R.

74—665; 77—3; 90—14, 11, 19